US012743736B1

(12) United States Patent
Hageman et al.

(10) Patent No.: US 12,743,736 B1
(45) Date of Patent: Sep. 22, 2026

(54) TRAINING GENERATIVE MODELS ON FEATURE-LEVEL RELATIONSHIPS

(71) Applicant: THE HUNTINGTON NATIONAL BANK, Columbus, OH (US)

(72) Inventors: Stephen James Hageman, Columbus, OH (US); Jonathan Murphy, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/415,388

(22) Filed: Dec. 10, 2025

Related U.S. Application Data

(63) Continuation of application No. 19/085,111, filed on Mar. 20, 2025, now Pat. No. 12,518,335.

(51) Int. Cl.
*G06F 18/2411* (2023.01)
*G06T 1/00* (2006.01)

(52) U.S. Cl.
CPC ........ *G06T 1/0021* (2013.01); *G06F 18/2411* (2023.01); *G06T 2201/0053* (2013.01)

(58) Field of Classification Search
CPC ...................... G06T 1/0021; G06T 2201/0053
See application file for complete search history.

(56) References Cited

U.S. PATENT DOCUMENTS

2023/0237334 A1* 7/2023 Pinheiro .................. G06N 3/08 382/224
2023/0316186 A1* 10/2023 Miller ..................... G06F 40/40 705/7.25
2024/0220532 A1* 7/2024 Schreiber ................ G06F 16/56
2026/0039568 A1* 2/2026 Qian ................... H04L 41/5074

FOREIGN PATENT DOCUMENTS

WO WO-2021028656 A1 * 2/2021 ........... G06V 30/143

* cited by examiner

*Primary Examiner* — Shefali D Goradia
(74) *Attorney, Agent, or Firm* — Kilpatrick Townsend & Stockton LLP

(57) ABSTRACT

Techniques are described herein for training a generative model to detect feature-level relationships across portions of an article representing a resource transfer. The method receives first and second images of respective areas containing user-defined features, supplies the images to a generative model that produces embeddings, and forms a combined embedding. A vector distance metric is computed by comparing the combined embedding to prior embeddings stored in a datastore. Based on whether the metric exceeds a threshold, a training label indicating match or mismatch is generated. The label is assigned a sample weight that varies with the age of the prior article that produced the compared prior embedding. The generative model is then trained by adjusting weights to reduce error between a generated output and the training label, yielding a trained model.

20 Claims, 8 Drawing Sheets

500

TRAINING GENERATIVE MODELS ON FEATURE-LEVEL RELATIONSHIPS

CROSS-REFERENCE TO RELATED APPLICATION

This application is a continuation of U.S. patent application Ser. No. 19/085,111, filed Mar. 20, 2025, the entirety of which is hereby incorporated by reference.

BACKGROUND

Image embeddings are used to create a numerical representations of images which can be used for identifying discrepancies that are outside of what may be considered normal. Some conventional methods can be used to generate image embeddings, however, these conventional methods fail to correlate parameters which may be associated with one another. For example, the parameters can include abstraction objects such as edges and shapes that are difficult to compress into a lower-dimensional vector, and in addition, lose semantic meaning of images being analyzed.

TECHNICAL FIELD

The present disclosure is directed to image processing. More particularly, the present disclosure describes components, methods, and systems to correlate vector metrics for image embedding processing.

BRIEF SUMMARY

Techniques are provided for image embeddings, and more particularly towards correlating features of articles using vector distance metrics. Various embodiments are described herein, including methods, systems, non-transitory computer-readable storage media storing programs, code, or instructions executable by one or more processors, and the like.

One embodiment is directed to a computer-implemented method comprising receiving an image associated with an article representing a transfer of at least one resource from a first entity to a second entity. The image may represent a user-defined feature of the article. The method may include providing, to a generative model, the image associated with the article representing the transfer of the at least one resource from the first entity to the second entity, wherein the generative model is configured to generate image embeddings from input images, receiving, from the generative model, an image embedding associated with the image associated with the article representing the transfer of the at least one resource from the first entity to the second entity, the image embedding encoding at least the user-defined feature of the article, determining a vector distance metric based at least in part on a vector distance comparison between the image embedding and a prior image embedding; and controlling one or more operations of a computer system based at least in part on the vector distance metric.

In some embodiments, determining the vector distance metric further comprises performing an iterative process, the iterative process comprising determining one or more vector distances between at least one first location of the image embedding and at least one second location of the prior image embedding, and determining the vector distance comparison based at least in part on the one or more vector distances, and repeating the iterative process for additional locations of the image embedding and additional locations of the prior image embedding until the vector distance comparison meets a threshold criteria.

In some embodiments, controlling the one or more operations further comprises controlling the computer system to cause a distribution of the at least one resource to the second individual based at least in part on the vector distance metric.

In some embodiments, the method further comprises determining whether an association exists between the first entity and the second entity based at least in part on the user-defined feature and a known parameter associated with the user-defined feature, wherein controlling the one or more operations further comprises: controlling a distribution of one or more resources from the first entity to the second entity based at least in part on the association and the vector distance metric.

In some embodiments, determining the vector distance metric further comprises determining whether a match between the image embedding and the prior image embedding exists based at least in part on one or more vector distances, and controlling the one or more operations further comprises preventing a distribution of the at least one resource to an individual based at least in part on the match; and providing a notification to one or more client devices associated with the first individual based at least in part on preventing the distribution.

In some embodiments, training the generative model with the image embedding based at least in part on vector distance metric, and updating a prior image embedding datastore with the image embedding, wherein the prior image embedding is stored within the prior image embedding datastore.

In some embodiments, receiving one or more additional images associated with another area of the article, wherein the another area is associated with a second user-defined feature of the article, the second user-defined feature being associated with the first individual, and extracting one or more image segments containing the second user-defined feature, and controlling the one or more operations further comprises controlling a distribution of the at least one resource to the second individual based at least in part on the vector distance metric and the one or more image segments.

At least one embodiment is directed to a system comprising one or more processors and one or more memories storing computer-executable instructions that, when executed by the one or more processors, cause the one or more processors to perform the method(s) disclosed herein.

At least one embodiment is directed to a computing device comprising one or more processors and one or more memories storing computer-executable instructions that, when executed by the one or more processors, cause the one or more processors to perform the method(s) disclosed herein.

At least one embodiment is directed to a non-transitory computer-readable storage medium storing computer-executable instructions that, when executed with one or more processors of a computing device, causes the one or more processors to perform the method(s) disclosed herein.

BRIEF DESCRIPTION OF THE DRAWINGS

Various embodiments in accordance with the present disclosure will be described with reference to the drawings, in which.

Figure 1:
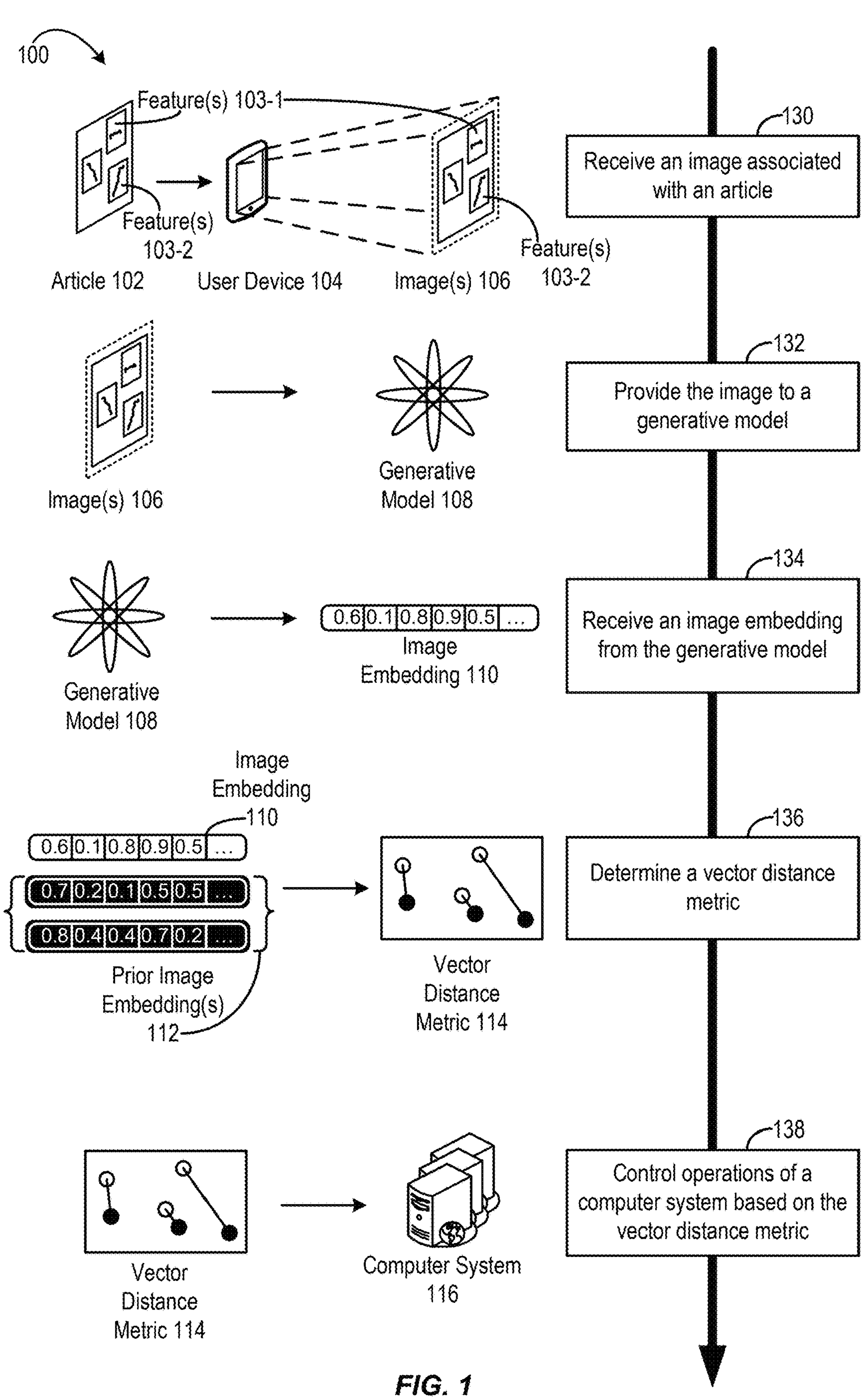
FIG. 1 is a simplified flow diagram for feature correlation, in accordance with at least one embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Identifying discrepancies between articles has conventionally relied on processor heavy methods using data extraction and comparison tools like scale-invariant feature transformations (SIFT) and speeded-up robust features (SURF). These techniques are computationally expensive especially when addressing large images and complex real-world scenes. Other techniques, such as dense image matching, are also computationally demanding and can measurably put excess demand on processing power depending on resolution and complexity of the real-world scene and/or article within the real-world scene. In addition, conventional image analysis techniques may use object detection frameworks or large architectures. These conventional models need large scale training and might include lots of parameters making them resource intensive on the device processing the images. Using these conventional techniques with modern devices such as smart phones pose numerous drawbacks due to the relatively limited processing capabilities and/or power availability of modern smart phones. This makes image processing for identifying discrepancies between articles, in-situ, using a portable device (e.g., smartphone, tablet, etc.) not ideal for the user and inconvenient if the user of the portable device wishes to limit how much processing is done and/or how much battery is drained by performing the analysis.

According to embodiments of this disclosure, image embedding techniques can be used to identify similarities and discrepancies between features within two or more images. Image embeddings may be generated by a trained generative model which converts images into numerical representations that capture visual features making image embedding processes computationally less demanding to compare and/or cluster images that are being compared to spot anomalies, discrepancies, and/or irregularities. Image embeddings can be used even when arbitrary rotations and transformations, as viewed in the image, have been performed as a result of a user capturing an image with a portable device (e.g., capturing an image with a smartphone in portrait or landscape orientations). As a result, using image embeddings to capture subtle visual details that are not conventionally detectable by humans leads to precise and accurate identification of anomalies, discrepancies, and/or irregularities.

The image embeddings, as mentioned previously, may include numerical representations of features of an image and may be plotted within a vector space. For example, a first image embedding for a first image may have a "first location" within the vector space while a second image embedding for a second image different from the first may have a "second location" within the vector space. These locations may be compared and "vector distances" between the locations may be calculated. The vector distances may be used as a metric to measure how similar two images are by determining the vector distance (or distances) in the vector space. The closer the vector distances are to one another, the more similar the images are. The farther the vector distances are to one another, the more dissimilar the images are. Fundamentally, the vector distances represent a semantic relation between images based on their vector distances. The vector distances may be used to calculate a vector distance metric representing an average that may be used to quantify the image and/or correlate the image embedding.

Conventionally, articles may contain one or more features (e.g., differently configured segments) that are associated with one or more entities (e.g., users, organizations, etc.). Between articles, the features may be the same or may change depending on the type of article, desired result, or suitable equivalents. These similarities or dissimilarities may or may not indicate anomalous discrepancies. For example, an identifier associated with a first entity may be the same on all associated articles while a descriptor associated with one or more second entities may be different on some or all associated articles. A prior database of image embeddings associated with entities may be maintained (e.g., created, updated, etc.) in order to compare image embeddings of a first image to one or more prior image embeddings associated with any suitable number of entities. The features of each article may be compared to prior image embeddings to determine if a correlation exists between the first entity and the second entity (or entities). If the correlation is determined to exist between the first entity and the second entity, a transfer of a resource from the first entity to the second entity may occur. If the correlation is determined to not exist or not meet a predefined threshold, the transfer of the resource from the first entity to the second entity may be stopped.

Accordingly, embodiments of the disclosure improve the technical field of vector correlation techniques using image embeddings to produce metrics associated with vector distances for identification of discrepancies between articles. For example, using image embeddings enables capturing minute visual details which traditional methods may miss which leads to more precise and quick identification of discrepancies between images of articles. Image embeddings are further robust against variations in orientation, depth of focus, field of view, rotation, translation, and suitable equivalents which is useful for users using handheld devices to capture images. Moreover, image embeddings excel at filtering out irrelevant variations in images which can mitigate false positives as compared to traditional systems. Utilizing the disclosed techniques, the discrepancies may be discovered more quickly and with more accuracy than conventional systems allow and in-situ where the user is currently located. This approach provides a faster and more real time solution as compared to other traditional techniques. Since approaches discussed herein rely primarily on retrieval and/or matching, rather than complex predictions or classifications, processing power and/or memory demands may be reduced. Because the techniques described herein are computationally lightweight, the processes can also be ran on edge devices such as smart phones, tablets, and/or suitable equivalents.

Illustrative Systems

FIG. 1 is a simplified flow diagram depicting a process 100 for feature correlation, in accordance with at least one embodiment. The operations discussed in connection with FIG. 1 may be performed with user device 104. In some embodiments, user device 104 may be implemented by one or more computer(s), as a service, within an application, or the like. The operations discussed in connection with process 100 may be performed in any suitable order. More or fewer operations than those depicted in FIG. 1 may be employed without diverting from this disclosure. User device 104 may communicate over cloud network, server, or networked devices, to perform the operations in process 100.

Some or all of the process 100 (or any other processes described herein (e.g., 600), or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 130, a user device 104 may use a detector (e.g., camera) to receive an image(s) 106 associated an article 102. The user device 104 may include a processor that may receive the image(s) 106 associated with the article 102. The article 102 may include one or more feature(s) 103-1 (e.g., a name) that are associated with a first entity (e.g., a first user) and one or more feature(s) 103-2 (e.g., a name) that are associated with a second entity (e.g., a second user). The feature(s) 103 may be captured in the image(s) 106 for processing by the user device 104 (e.g., software, firmware, hardware, etc.) or by communicating the image(s) 106 using the user device 104 to a remote system (e.g., server, cloud computing environment, etc.) such as computer system 116 (which is an example of computer system(s) 706 with respect to FIG. 7) for remote processing. The dashed lines between the user device 104 and the image(s) 106 depict a blowout of a field of view (FOV) (dotted line) of the camera of the user device 104 which captured the image(s) 106 and should not be considered limiting. Throughout this disclosure, reference will be made to the term "user device" for clarity and ease of reference. This term is not meant to be limiting, and it should be readily recognized to one skilled in the art that suitable equivalents may be substituted for the user device 104 including, without limitation, computer(s), smartphone(s), tablet(s), server(s), virtual/augmented reality device(s), etc.

At 132, the image(s) 106 may be provided to a generative model 108 (e.g., a convolution neural network (CNN) or suitable equivalent). The image(s) 106 may be provided with a prompt and/or may be provided to the generative model 108 as raw image data. As will be discussed in more detail with respect to FIG. 3, the generative model 108 may be pre-trained and/or may be trainable using the image(s) 106.

At 134, the user device 104 may receive one or more image embeddings 110 from the generative model 108. The image embedding 110 may be a numerical representation (e.g., similar to the depicted row of decimal numbers) of the image(s) 106. For example, if there were two images provided to the generative model 108 at 132, two image embeddings may be returned to the user device 104. In some examples, the generative model 108 may be aware that sequential images provided are contextually related (e.g., a series of images relayed as a group or in sequential order).

At 136, at least one vector distance metric 114 may be determined based at least in part on the image embedding 110. The vector distance metric 114 may be determined by computing a vector distance between one or more prior image embedding(s) 112 (e.g., stored in memory 722 with respect to FIG. 7). The vector distances (e.g., vector distances 411 with respect to FIG. 4) between vectors in the image embedding 110 and the prior image embeddings 112 may be compared. In some examples, the prior image embeddings 112 may include a database of prior image embeddings that have been populated based on known and/or validated features (or images) related to one or more entities. The database of prior image embeddings may be associated with the one or more entities by at least one parameter. In addition, or alternatively, the image embedding 110 may be added to the prior image embeddings 112 if the image embedding 110 is determined to not include discrepancies. In some examples, it may be determined that the image embedding 110 is a new image embedding with no prior association with any prior image embedding 110. In these examples, the image embedding 110 may be added to the database of prior image embeddings 112. The vector distance metric 114 may then be calculated based at least in part on an analysis (e.g., cosine similarity analysis) of each vector distance computed between the numerical values. The vector distance metric 114 may be a score between negative one and one, where scores closer negative one indicate a greater possibility of discrepancy and values closer to one indicate a greater possibility of no discrepancy between the image embedding 110 and the prior image embedding(s) 112. A range of the vector distance metric 114 should not be considered limiting, and any suitable metric equivalent for quantizing variations between image embeddings may be used.

At 138, one or more operations of a computer system 116 (e.g., a resource storage center) may be controlled based at least in part on the vector distance metric 114. For example, the operations may cause a distribution of a resource from the first entity to the second entity based on the vector distance metric 114 being close to one (e.g., 0.95) or may prevent the distribution of the resource from the first entity to the second entity based on the vector distance metric 114 being close to negative one (e.g., −0.75).

Figure 2:
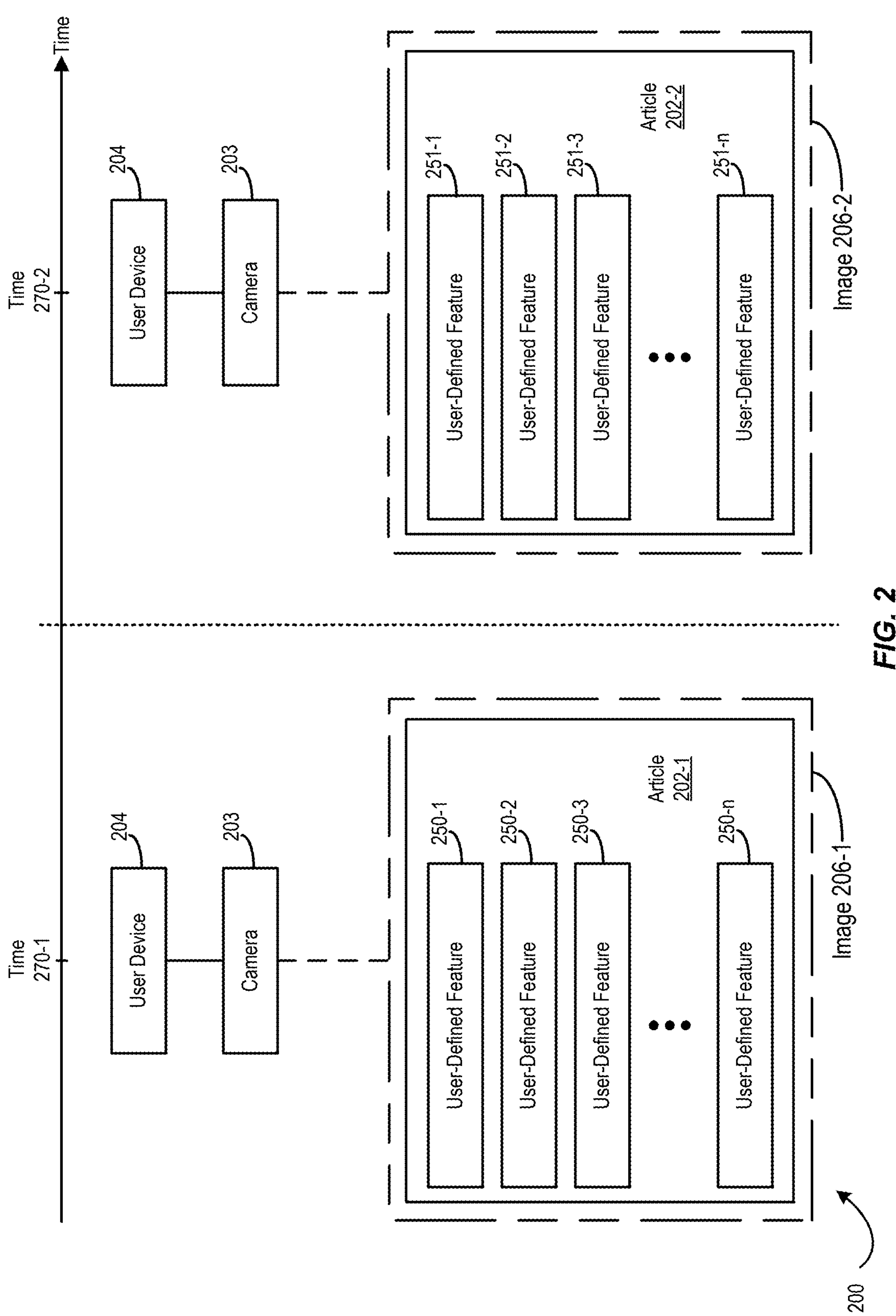
FIG. 2 is a simplified block diagram for an example feature correlation system, in accordance with at least one embodiment.

FIG. 2 is a simplified block diagram for an example feature correlation system 200, in accordance with at least one embodiment. The system 200 is depicted during a first time 270-1 and a second time 270-2, denoted with separation with the dotted line for clarity. During the first time 270-1, an image 206-1 is captured of article 202-1 using camera 203 (which is an example of camera 703 with respect to FIG. 7) and during the second time 270-2, an image 206-2 is captured of article 202-2. Article 202-1 and the article 202-2 may be two different sides of the same article. For example, the article 202 may be a piece of paper with a front side and a back side. Image 206-1 may be an image of the front side of the paper and image 206-2 may be an image of the back side of the paper.

Article 202-1 may include a plurality of user-defined features 250-1 to **250-*n* (which are examples of feature(s) 103 with respect to FIG. 1), where n is the total number of distinct features capable of being captured in an image. Similarly, article 202-2 may include a plurality of user-defined features 251-1 to 251-*n* (which are examples of feature(s) 103 with respect to FIG. 1), where n is the total number of distinct features capable of being captured in an image. The user-defined features 250 and/or the user-defined features 251 may be associated with a first entity and/or a second entity. For example, user-defined feature 250-1 may include a typed identifier (e.g., name) associated with the first entity, user-defined feature 250-2 may include a graphical identifier (e.g., a brand logo) associated the first entity, user-defined feature 250-3 may include a resource number (e.g., a transferable value) associated the first entity, while user-defined feature 251-1** may include a hand-written identifier (e.g., a signature) associated with the second entity.

Figure 3:
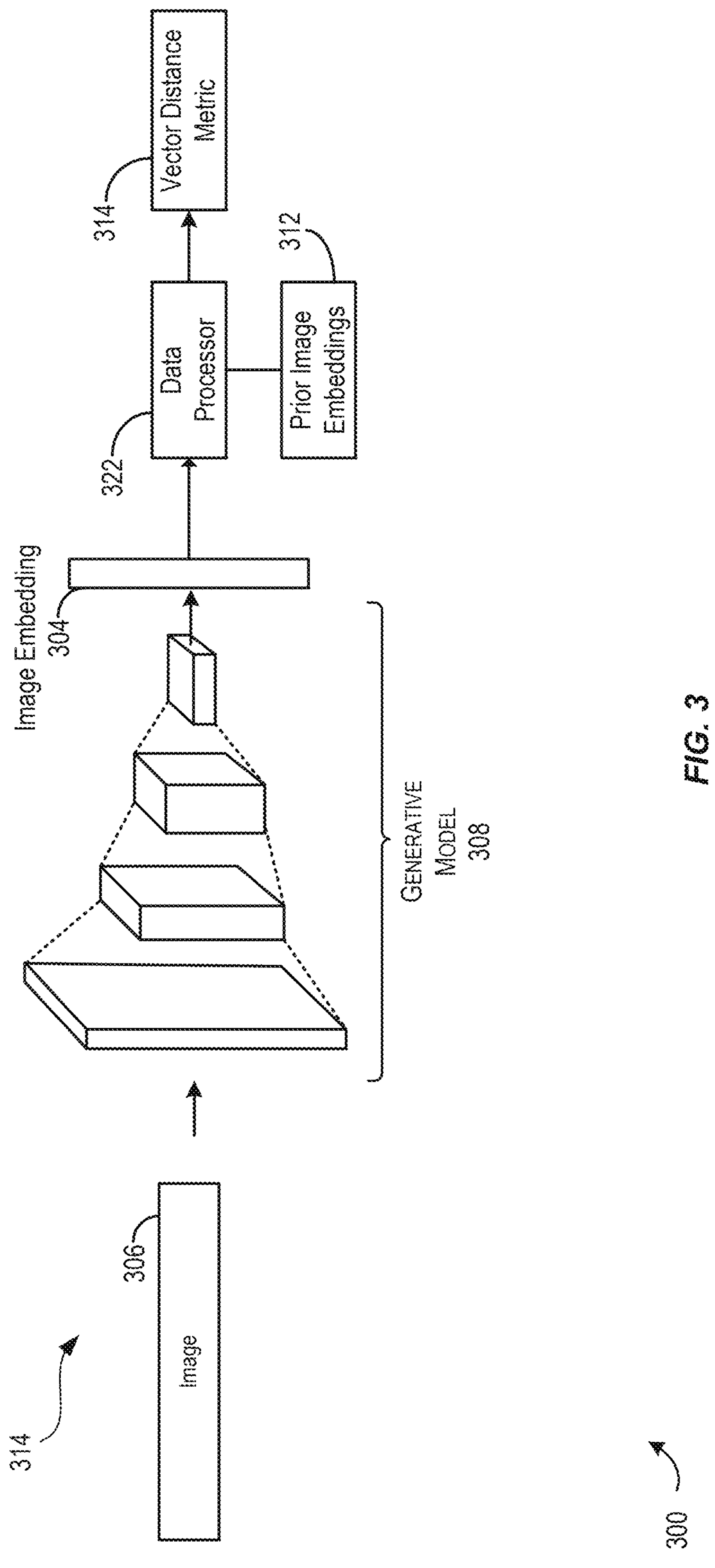
FIG. 3 is a simplified block diagram illustrating techniques for utilizing a generative model to correlate features of an image embedding, in accordance with at least one embodiment.

FIG. 3 is a simplified block diagram 300 illustrating techniques for utilizing a generative model to correlate features of an image embedding, in accordance with at least one embodiment. In some embodiments, generative model 308 may receive an image 306 including one or more features (e.g., user-defined features 251 with respect to FIG. 2) in order to provide an output (e.g., image embedding 304) may be provided to data processor 322 to produce a vector distance metric 314. Generative model 308, shown as a collection of layers (blocks with dotted lines connecting each) performing transformations of input images into image embeddings, may be example of a convolutional generative model. Convolutional generative models are a class of deep generative models that may be used to identify patterns in images, natural language processing, signal processing and the like. Layers may include any suitable convolutional layer (e.g., configured to detect certain features of the input based on one or more filters, a layer that performs a convolution operation to input and passes the result to the next layer), rectified linear unit layers (e.g., configured to remove unwanted numbers such as negative numbers), pooling layers (e.g., layers that take a larger input and distill the input to a smaller form), and flattening layers (e.g., a layer configured to convert two-dimensional arrays from pooled features into a single, long continuous linear vector).

Generative model 308 may be configured to generate image embedding 304 from image 306 by passing input incrementally through layers. In some embodiments, input may be a user-defined feature (e.g., signature) or any suitable portion of an article (e.g., article 202-1 with respect to FIG. 2). In some embodiments, the input may be a user-defined feature corresponding to a first and/or second entity.

Data processor 322 may be an example of a transformer. In some embodiments, data processor 322 may be configured with any suitable number of additional layers such as flattening layers (e.g., a layer configured to convert two-dimensional arrays from pooled features into a single, long continuous linear vector), fully connected layers (e.g., layers in which every input of a vector generated by one or more previous layers is connected to a corresponding portion of an output vector), and soft-max layers (e.g., a layer configured to turn values of an output vector to values that, when summed together, add up to 1 or a predefined maximum value). Data processor 322 may be configured to compare the image embedding 304 to the one or more prior image embeddings 312 based at least in part on any suitable similarity calculation technique. The prior image embeddings 312 may be stored in a database of prior image embeddings which includes image embeddings associated with one or more entities. The prior image embeddings 312 may include known and/or validated examples of image embeddings that have been determined to be valid for comparisons to new image embeddings (e.g., image embedding 304) being input. By way of example, a cosine similarity may be calculated vector distances between vectors in embeddings to determine a degree of similarity between the two. The data processor 322 may provide the result of the similarity calculation as a vector distance metric 314. The vector distance metric 314 may be used to determine whether the image embedding 304 matches one or more of the prior image embeddings. By way of example, the vector distance metric 314 may be a number between zero and ne, where the closer the number is to one, the stronger the confidence that the embeddings match, whereas the closer the number is to zero, the stronger the confidence is that the embeddings do not match. In some embodiments, the image embedding 304 to the one or more prior image embeddings 312 may be identified as matching only when the vector distance metric 314 breaches a predefined threshold (e.g., 0.8, 0.9, etc.).

Although not depicted, generative models 308 may include weights corresponding to each portion of a fully connected layer. These weights express connection strengths between each value and a corresponding category or classification (e.g., vector distance metric 314 indicating a match or mismatch). Additionally, the generative models 302 may be configured with hyperparameters (not depicted) which may be predefined and user configurable. These hyperparameters may identify how many features are to be utilized for each convolutional layer, what window size or stride is used for each pooling layer, a number of hidden neurons to be used for each fully connected layer, or the like.

In some embodiments, generative model 308 may be initialized with random or predefined weights. Through a training process, the generative model 308 may be trained to identify matches between images provided as input (e.g., any suitable portion of respective check images) based at least in part on a training data set (not depicted) for which inputs (e.g., respective check images) and outputs (indicating a match or mismatch between the inputs) is known. An input example of a training data set (e.g., comprising two images of any suitable portion of an article) may be processed by the generative model 308, the resulting vectors may then be processed by the data processor, and the output of which may be compared to the known label (e.g., match/mismatch) or value (e.g., 0.95 indicating a match, 0.23 indicating a mismatch, etc.) for the example. Any error found between the generated output and the known label/value may be used to modify the weights of the generative model 308. The process may be repeated any suitable number of times until error between the output produced by the generative model 308 is within a threshold of accuracy to known values. By way of example only, the generative model 308 may be trained and weights adjusted until output produced by the generative model 308 is within a threshold error rate (e.g., 95% accuracy).

Illustrative Methods

Figure 4:
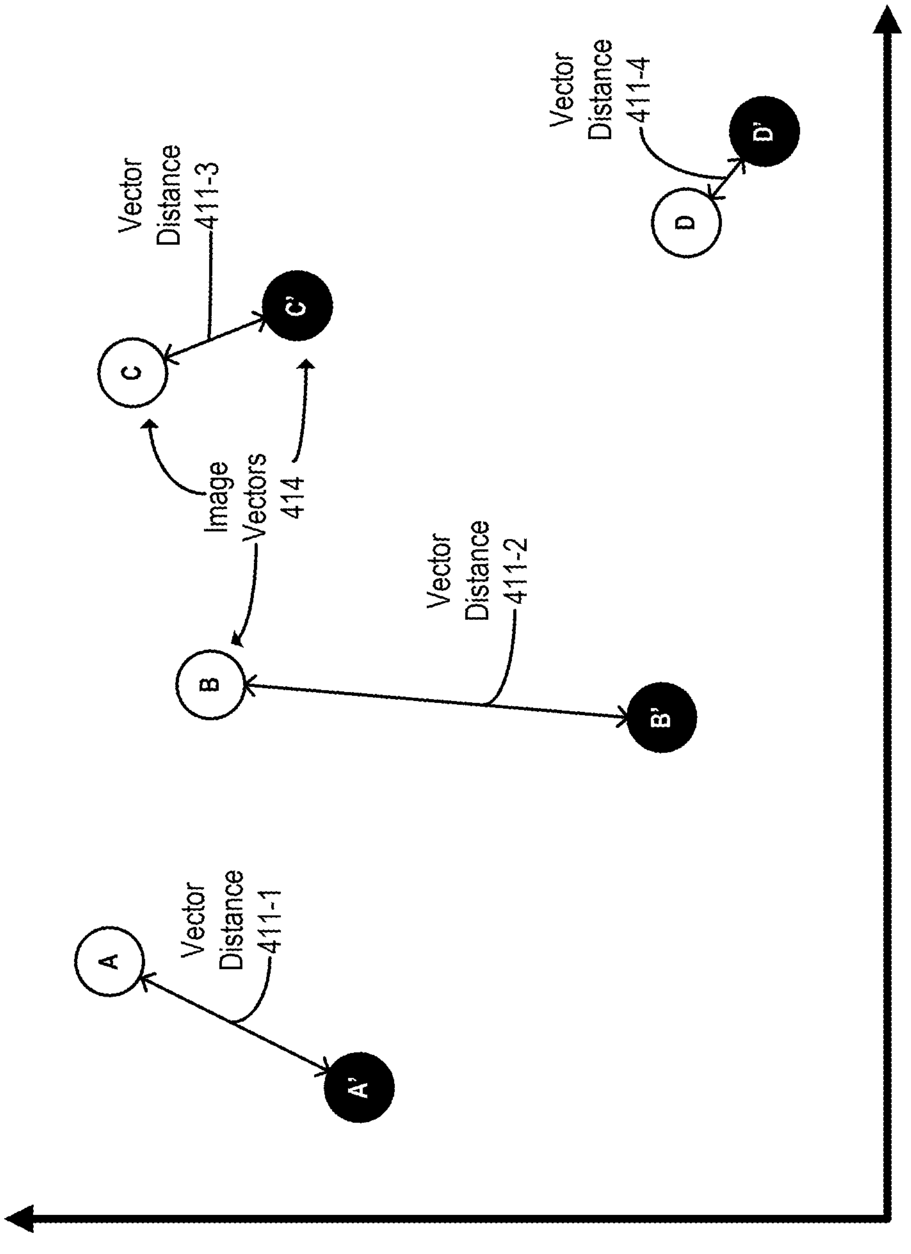
FIG. 4 is a simplified diagram of example vector distance metrics with discrepancies, in accordance with at least one embodiment.
Figure 4:
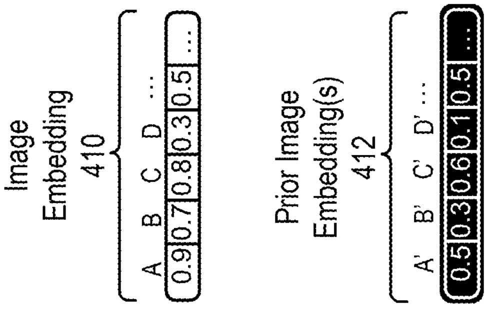
Figure 4:
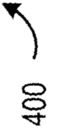

FIG. 4 is a simplified diagram 400 of example vector distance metrics with discrepancies, in accordance with at least one embodiment. The diagram 400 depicts a series of image vectors 414 (e.g., A-D, A'-D') with vector distances calculated therebetween (e.g., vector distances 411-1 to 411-4). While only four image vectors 414 are illustrated for clarity of discussion, this should not be considered limiting, and any suitable number of image vectors 414 may be produced by a processor (as discussed in more detail with respect to FIG. 3) after receiving a suitable image embedding 410 from a generative model. Each of the image vectors may be located at a location corresponding to a location on the article which was captured in an image (as discussed with respect to FIGS. 1 and 2). One or more prior image embedding(s) 412 may be stored in memory and retrievable by the processor for comparison to the image embedding 410. As mentioned with respect to FIG. 2, the image embedding 410 may include user-defined features represented by image vectors. The prior image embedding(s) 412 may represent image embeddings without discrepancies (e.g., without errors, without typographical errors, etc.) and associated with one or more entities. For example, a first entity which may have captured images of similar articles in the past may have a collection or prior image embedding(s) stored in memory. In some examples, the prior image embedding(s) 412 are based at least in part on a collection of entities that have been pre-screened and/or known to not contain discrepancies.

In the example of diagram 400, image vectors for the image embedding 410 are depicted as the white circles A-D and the prior image embedding(s) 412 are depicted as the black circles A'-D'. In this example, for the selected image vectors 414 A-D/A'-D', vector distances 411 may be calculated. Vector distances 411 may be calculated as a relative magnitude (e.g., Euclidean distance) and/or angle between two image vectors or may be determined as a distance and/or angle from a pre-defined coordinate (e.g., a coordinate origin). In addition, or alternatively, an L1 Norm Manhattan distance may be utilized to calculate a sum of absolute differences between corresponding image vectors to weight individual feature differences. Moreover, a cosine similarity measure may measure relative angles between image vectors to determine a relative direction of the image vectors rather than a magnitude (relative or absolute) of the vector distance 411. A vector distance metric may be made based at least in part on comparisons of the vector distances 411 between the image vectors 414. The vector distance metric may be used to quantify how similar the image embedding 410 is to any one or more of the prior image embedding(s) 412 based on, without limitation, an average, a mean, a median, or combinations thereof of the image vectors 414.

As discussed previously, different similarity measures may be used to calculate the vector distance metric for comparisons of the image embeddings 410 and prior image embeddings 412. Depending on the similarity measure selected, similarity between image embeddings 410 and prior image embeddings 412 may increase or decrease. For example, a Euclidean distance similarity measure, which measures distances between ends of image vectors 414, will decrease as similarity between image embeddings 410 and prior image embeddings 412 increases. A cosine similarity measure, which measures a cosine of an angle between vectors, may increase as similarity between image embeddings 410 and prior image embeddings 412 increases. A dot product similarity measure, which measures a cosine of an angle between respective image vectors multiplied by the length of the respective image vectors, may increase as similarity between image embeddings 410 and prior image embeddings 412 increases.

In the example depicted in FIG. 4, the relatively large vector distances 411 (as compared to vector distances 511 with respect to FIG. 5) may indicate that there may be a discrepancy between the image embeddings 410 and prior image embeddings 412. The discrepancy can be related to the whole image (e.g., image 206 with respect to FIG. 2) or may be related to one or more user-defined features (e.g., user-defined features 250/251 with respect to FIG. 2), or both.

Figure 5:
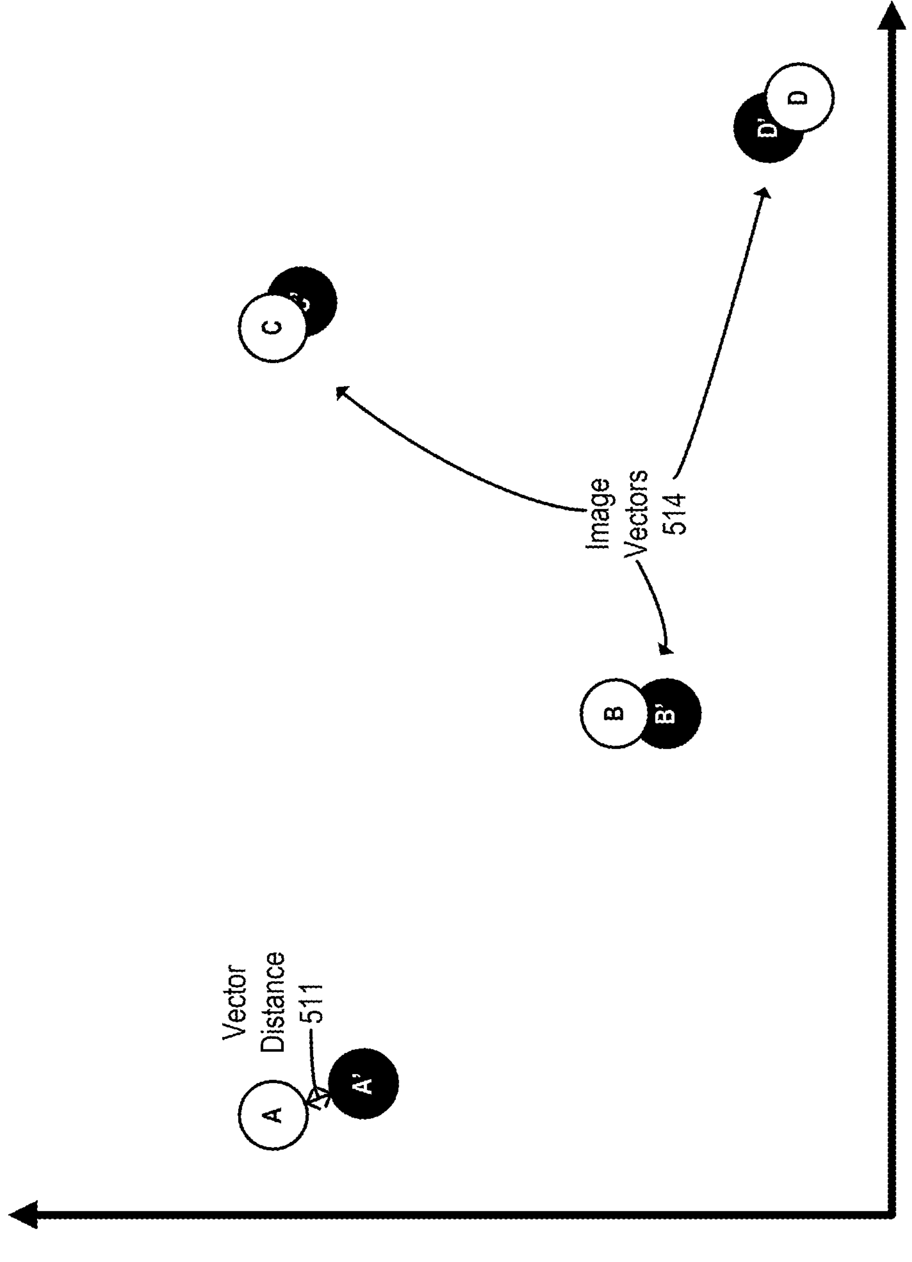
FIG. 5 is a simplified diagram of example vector distance metrics without discrepancies, in accordance with at least one embodiment.
Figure 5:
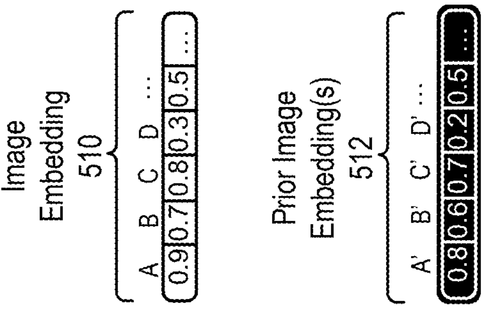

FIG. 5 is a simplified diagram 500 of example vector distance metrics without discrepancies, in accordance with at least one embodiment. The diagram 500 depicts a series of image vectors 514 (e.g., A-D, A'-D') with vector distances calculated therebetween (e.g., vector distances 510). While only four image vectors 514 are illustrated for clarity of discussion, this should not be considered limiting, and any suitable number of image vectors 514 may be produced by a processor (as discussed in more detail with respect to FIG. 3) after receiving a suitable image embedding 510 from a generative model. Reference is made to the discussion regarding FIG. 4, in that the vector distances 511 may be used for comparison to determine the vector distance metric using the aforementioned similarity measures. In this example, since the vector distances 511 are relatively small (as compared to FIG. 5), there may be small differences between the image embeddings 510 and prior image embeddings 512 indicating no or few discrepancies.

Figure 6:
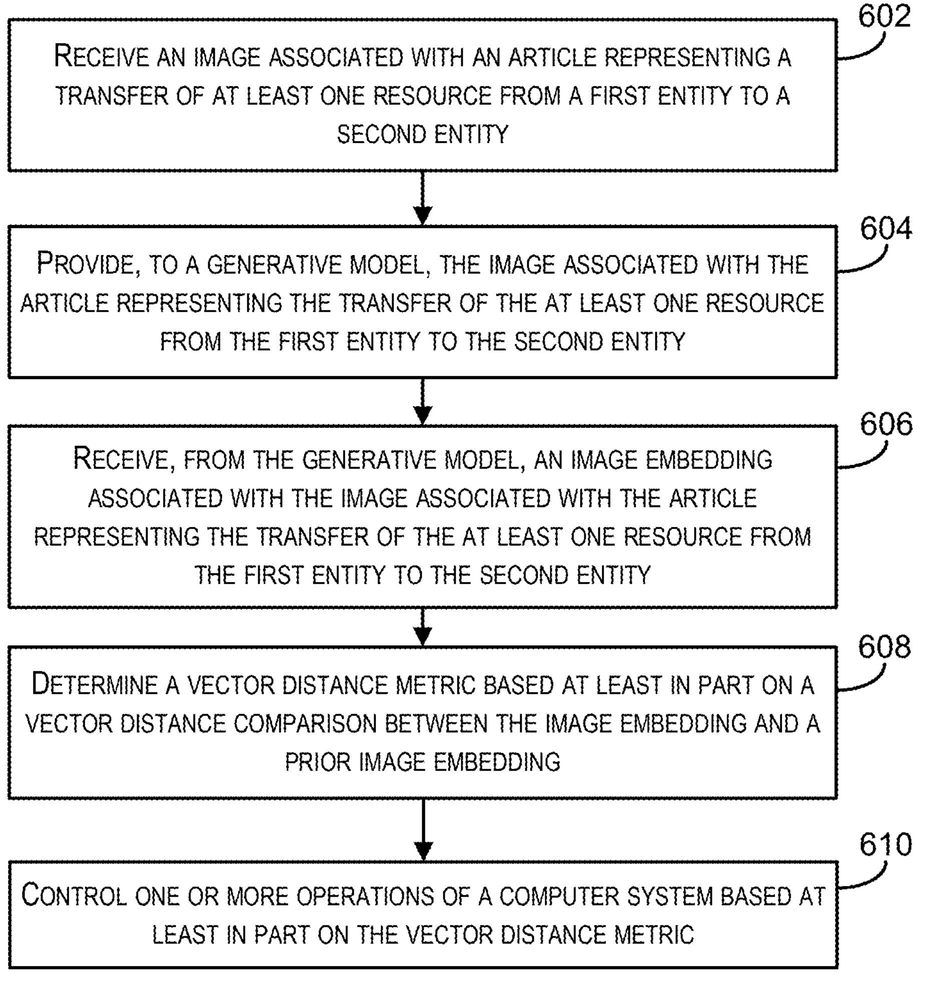
FIG. 6 is a block diagram illustrating an example method for determining a vector distance metric, in accordance with at least one embodiment.

FIG. 6 is a block diagram illustrating an example method 600 for determining a vector distance metric, in accordance with at least one embodiment. FIG. 6 is a block diagram illustrating an example method 600 for determining the vector distance metric, in accordance with at least one embodiment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 600 may include additional, or fewer operations than those depicted in FIG. 6. The operations of method 600 may be performed by any suitable portion of the computer system 706 of FIG. 7 (an example of the user device 104 of FIG. 1) which may include one or more computing devices such as computing device 718 of FIG. 7.

At 602, an image associated with an article (e.g., article 102 with respect to FIG. 1) representing a transfer of at least one resource from a first entity to a second entity may be received. The image may represent a user-defined feature (e.g., user-defined feature 250 with respect to FIG. 2) of the article. In some examples, a user device (e.g., a smart phone) may capture the image associated with the article using a camera and store the image for processing. The user device may be held by a user in-situ and may capture the image of the article within a real-world scene.

At 604, the image associated with the article representing the transfer of the at least one resource from the first entity to the second entity may be provided to a generative model (e.g., generative model 308 with respect to FIG. 3). The generative model may be configured to generate image embeddings (e.g., image embedding 304 with respect to FIG. 3) from input images. For example, the user device may include a trained generative model stored in memory (e.g., memory 722 with respect to FIG. 7) which is capable of receiving and processing the image (as raw image data) and converting the image into one or more image embeddings at 606. In addition, or alternatively, the user device may communicate with one or more servers remotely (e.g., over a network) in order to relay the image to the server. In this example, the server may have a trained generative model that is capable of converting the image sent from the user device to one or more image embeddings.

At 606, an image embedding associated with the image associated with the article representing the transfer of the at least one resource from the first entity to the second entity may be received from the generative model. The image embedding may be a numerical representation and/or a vector representation of the image provided to the generative model. In examples where the user device includes the generative model for converting the image to the image embedding, the generative model may output the image embedding which may then be stored for further processing in the memory of the user device. In examples where the user device relays the image to a server that is remote from the user device for processing by a remote generative model, the user device may receive the image embedding over a network from the generative model. In these examples, the image embedding may also be accompanied by one or more determinations (as in 608) by the server in order to reduce and/or limit processing demands on the user device.

At 608, a vector distance metric based at least in part on a vector distance comparison between the image embedding and a prior image embedding may be determined. The prior image embeddings may be image embeddings which were determined previously and/or input into the user device previously. In some examples, the image embeddings may be stored in memory for future retrieval as prior image embeddings when determined as valid and/or to contain known features and/or correlations to known features for future comparisons. The vector distance metric may be determined by performing an iterative process (e.g., until a threshold criteria is met). For example, one or more vector distances (e.g., vector distances 411 with respect to FIG. 4) may be determined between a first location (e.g., a vector location of the image vector) of the image embedding and a second location of a prior image embedding (e.g., prior image embedding 312 with respect to FIG. 3). A vector distance comparison may be made based at least in part on the vector distances calculated at the locations. In some examples where little to no discrepancy is determined, the first and second location may be relatively close (e.g., vector distance 511 with respect to FIG. 5), and where discrepancy is determined to exist, the first and second location may be relatively distant (e.g., vector distance 410-2 with respect to FIG. 4). Some or all "locations" of the image embedding may be compared during the iterative process until the comparison meets a threshold (e.g., greater than seventy-five percent chance at a discrepancy being determined to exist in the image embedding). In some examples, the user device performs the comparison. In addition, or alternatively, the user device may communicate with a server to request the server perform the comparison and relay the results of the comparison back to the user device.

In some examples, only an image segment of the article may be transformed by the generative model into the image embedding. The vector distance metric may be based at least in part on a comparison of a portion of the article that includes the user-defined feature. In these examples, the vector distance metric may be based at least in part on the user-defined feature and an associated prior user-defined feature (from prior image embeddings).

In a non-limiting example, the user device may calculate a first vector distance from a feature of a first image embedding to a feature of a second image embedding. The first image may include a representation of an animal such as blue heeler dog with rigid pointed ears whereas the second image may include a representation of another animal such as a border collie dog with folded flexible ears. The two animals are dissimilar animals structurally but also have some common features (e.g., ear placement, quadrupedal, tails, etc.). In this example, the first image embedding may include an image vector for the blue heeler dog's left ear (e.g., feature) and the second image embedding (e.g., prior image embedding) may include an image vector for border collie dog's left ear (e.g., feature). The user device may calculate a vector distance metric based on a vector distance between the two image vectors to determine how similar the two images are. If the left ears of the blue heeler dog and the border collie dog are too different (within a threshold), the user device may determine, based on the vector distance metric, that there is a discrepancy between the two images. In some examples, this process may be performed by a server remote from the user device where the user device requests the analysis of the image embedding.

In some examples, determining the vector distance metric includes determining whether or not a match exists between the image embedding and the prior image embedding based at least in part on the one or more vector distances. The match may be determined by a similarity measure (as discussed in more detail with respect to FIGS. 4 and 5). In some embodiments, the operations may be controlled to allow or prevent a distribution of at least one resource from the first entity to the second entity based at least in part on the match. In addition, or alternatively, a notification to a client device (e.g., user device 104 with respect to FIG. 1) associated with the first entity (or the second) based at least in part on allowing or preventing the distribution. The notification may be a text message (e.g., SMS message), haptic feedback (e.g., vibration), a visual indicator (e.g., blinking light, green indicator, red indicator, etc.), or combinations thereof.

At 610, one or more operations of a computer system may be controlled based at least in part on the vector distance metric. In some examples, the computer system may be controlled to cause a distribution of at least one resource to a second entity from the first entity based at least in part on the vector distance metric. For example, the computer system may be an organizational system associated with the first entity and the second entity that facilitates the allocation of one or more resources from the first entity to the second entity. In this example, once the user device determines that the is or is not a discrepancy between the image embedding and the prior image embedding (as discussed previously in 602-608), the user device may send a confirmation (e.g., acknowledgement) to the computer system that transfer of the resource from the first entity to the second entity is or is not permitted.

According to some embodiments, if a discrepancy is determined to exist between the image embedding and the prior embedding, the user device may notify a third-party associated with one or both of the first and second entities of the discrepancy. In this manner, the user device may additionally, or alternatively, store the image embedding for later retrieval as a prior image embedding along with a descriptor noting that the image embedding could not be correlated to a prior image embedding (and/or entity) and indicates a discrepancy in the image embedding. In addition, or alternatively, in instances where discrepancies are found, the entity associated with the discrepancy may be identified and stored in memory for later retrieval or reference. For example, if a new image embedding is input into the user device that corresponds to a prior image embedding associated with an entity (e.g., second entity) previously determined to have a discrepancy, then the operations of the computer system may be controlled accordingly (e.g., prevent transfer of resource from first entity to second entity).

According to some embodiments, the user device may communicate with a second user device (e.g., server, second entity user device, etc.) over a network. Controlling the operations may occur over the network and may control the second user device to transfer the resource from the first entity to the second entity (or vice versa) or control the second user device. For example, the user device may control and/or instruct the server to process an image to generate an image embedding, provide permissions and/or validations to transfer resources, and/or provide notifications to third-parties.

Illustrative System Architecture

Figure 7:
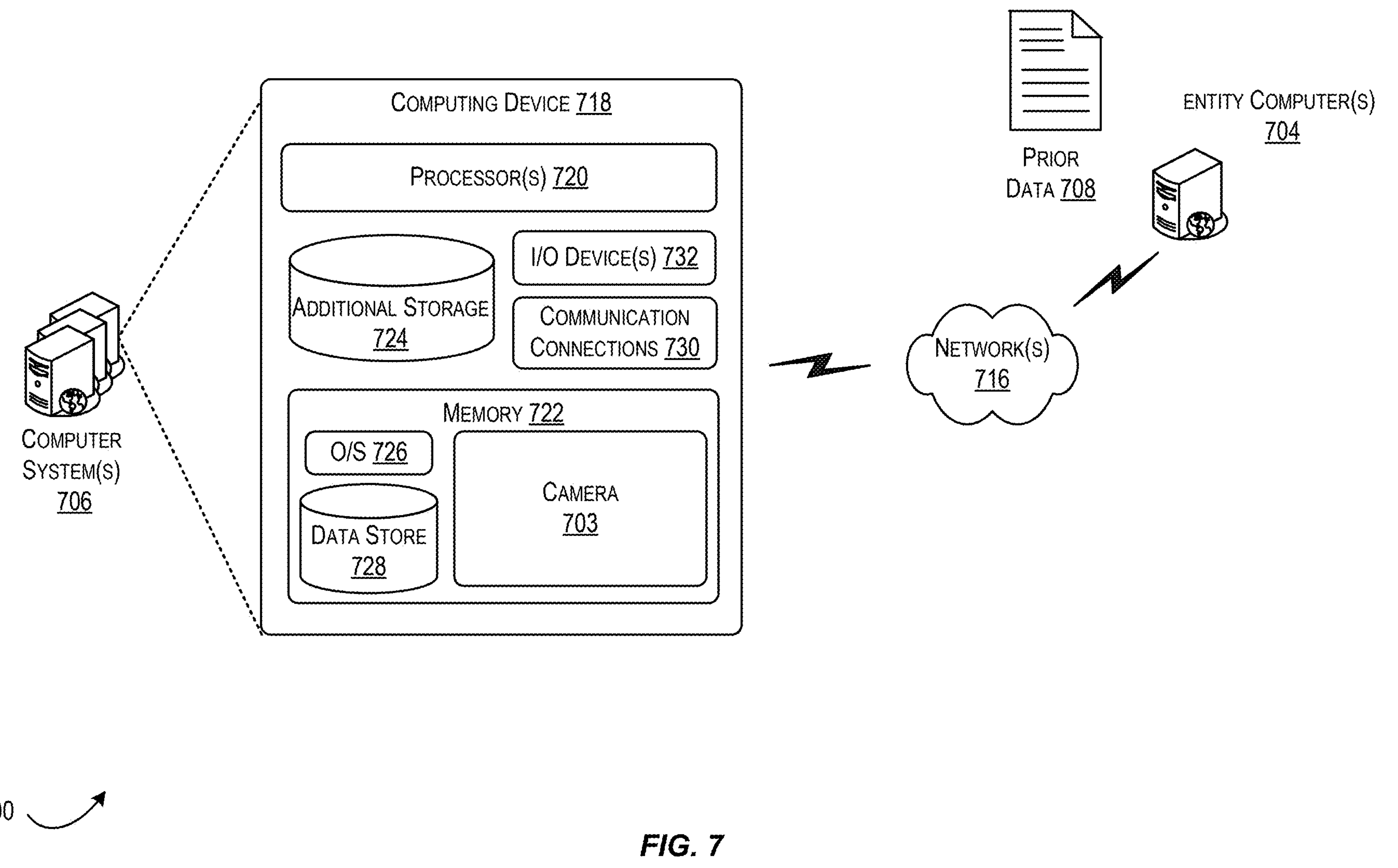
FIG. 7 is a schematic diagram of an example computer architecture for the feature correlation system, including a plurality of components that may perform functions in accordance with at least one embodiment.

FIG. 7 is a schematic diagram of an example computer architecture for the feature correlation system, including a plurality of components that may perform functions in accordance with at least one embodiment. FIG. 7 is a block diagram illustrating an example system 700 including a computer system 706 (an example of the user device 104 of FIG. 1), in accordance with at least one embodiment. System 700 may be configured to perform image embedding comparisons to facilitate transfer of one or more resources between entities such as a first entity (e.g., a first individual wanting to transfer the resource) and a second entity (e.g., a second individual wanting to receive the resource). Entity computer(s) 704 may represent one or more computing devices corresponding to an entity which stores, controls, and/or facilities transfers of resources between entities.

In some embodiments, prior data 708 may include any suitable number of output(s) provided by generative model 308 of FIG. 3. These outputs may individually indicate whether an image (e.g., image 106 with respect to FIG. 1) obtained from user device 104 was identified as matching one or more user-defined features and/or images obtained from and/or associated with prior image embeddings associated with the first entity. In some embodiments, any suitable number of these outputs may be combined into a value that indicates a percentage of prior images that were deemed to match the article image or portion of the article image obtained from prior data (as discussed in more detail with respect to FIGS. 3-6).

In some embodiments, the entity computer(s) 704 may be configured to communicate via network 716. Network 716 may include any suitable combination of many different types of networks, such as cable networks, the Internet, wireless networks, cellular networks, and other private and/or public networks.

The entity computer(s) 704 may each be an example of the computing device 718. In some embodiments, the computing device 718 may include one or more processors (e.g., processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language.

Computing device 718 may include memory 722. The memory 722 may store computer-executable instructions that are loadable and executable by the processor(s) 720, as well as data generated during the execution of these programs. The memory 722 may be volatile (such as RAM) and/or non-volatile (such as ROM, flash memory, etc.). The computing device 718 may include additional storage (e.g., storage 724), which may include removable storage and/or non-removable storage. Storage 724 may include, but is not limited to, magnetic storage, optical disks and/or tape storage. The disk drives and their associated computer-readable media may provide non-volatile storage of computer-readable instructions, data structures, program components, and other data for the computing devices.

The memory 722 and/or storage 724 may be examples of non-transitory computer-readable storage media. Computer-readable storage media may include volatile, or non-volatile, removable, or non-removable media implemented in any method or technology for storage of information such as computer-readable instructions, data structures, program components, or other data. Memory 722 and/or additional storage 724 may include, but are not limited to, any suitable combination of PRAM, SRAM, DRAM, RAM, ROM, EEPROM, flash memory or other memory technology, CD-ROM, DVD, magnetic tape, magnetic disk storage or other magnetic storage devices, or any other medium which can be used to store desired information, and which can be accessed by the computing device 718. Computer-readable media may include computer-readable instructions, program components, or other data transmitted within a data signal, such as a carrier wave, or other transmission. However, as used herein, computer-readable storage media does not include computer-readable communication media.

The memory 722 may include an operating system 726 and one or more data stores 728, and/or one or more application programs, components, or services. The computing device may also contain communications connection(s) 730 that allow the computing device 718 to communicate with a stored database, another computing device, a server, user terminals and/or other devices (e.g., via one or more networks, not depicted). The computing device may include I/O device(s) 732, such as a keyboard, a mouse, a pen, a voice input device, a touch input device, a display, speakers, a printer, etc.

In some embodiments, the memory 722 may store instructions that, when executed by processor(s) 720 implement the functionality described herein with respect to the detection system 702 (e.g., the user device 104 of FIG. 1).

Figure 8:
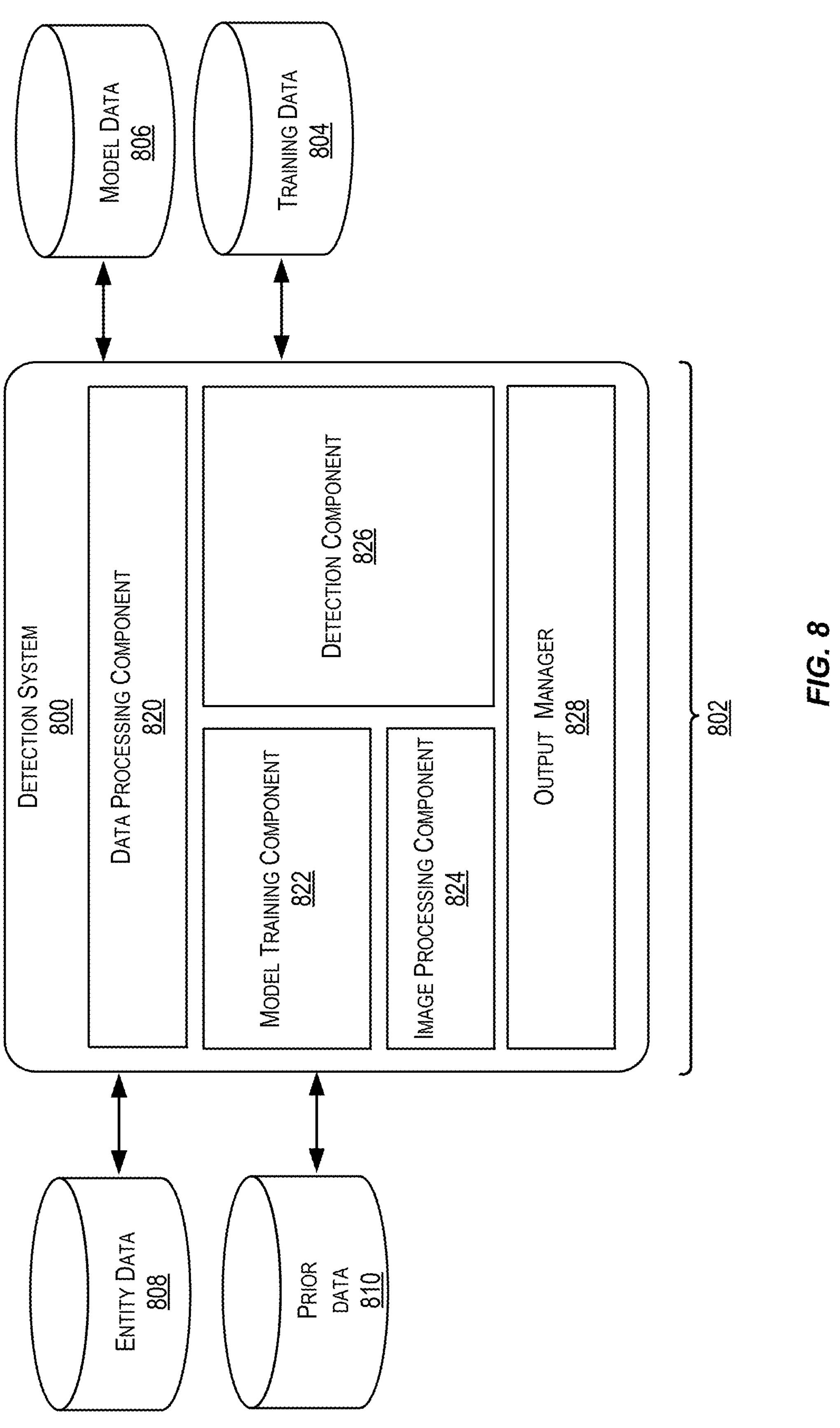
FIG. 8 is a schematic diagram of an example system for the feature correlation system, including a plurality of components that may perform functions in accordance with at least one embodiment.

FIG. 8 is a schematic diagram of an example system 800 for the feature correlation system, including a plurality of components that may perform functions in accordance with at least one embodiment. FIG. 8 is a schematic diagram of an example computer architecture for the user device 104 of FIG. 1, or any system, device, or component disclosed herein, including a plurality of components that may perform functions in accordance with at least one embodiment. Detection system 800 may be executed by the entity computer(s) 704 of FIG. 7. The components 802 may be software components, hardware components, or a combination thereof. If the components are software components, the components can be embodied on a computer readable medium and processed by a processor in any of the computer systems described herein. It should be noted that any component or data store described herein, may be, in some embodiments, be a service responsible for providing functionality corresponding to the component described below. The components 802 may be execute as part of the detection system 800, or the components 802 may exist as separate components or services external to the detection system 800. In some embodiments, the components 802 may be executed by the same or different computing devices, as a service, as an application, or the like.

In the embodiment shown in the FIG. 8, data stores such as those labeled in FIG. 8 as training data 804, model data 806, entity data 808, and prior embedding data 810 (e.g., data stores), are shown, although data can be maintained, derived, or otherwise accessed from various data stores, either remote or local to the detection system 800, to achieve the functions described herein. The detection system 800, as shown in FIG. 8, includes various components such as a data processing component 820, model training component 822, image processing component 824, detection component 826, and output manager 828. Some functions of the components 820, 822, 824, 826, and output manager 828 are described below. However, for the benefit of the reader, a brief, non-limiting description of each of the components is provided in the following paragraphs.

Data processing component 820 may receive any suitable data (e.g., entity data, prior data 708 of FIG. 7, etc.) from one or more networks (e.g., e.g., network(s) 716, an example of the Internet, wide area networks "WAN", local area networks "LAN", etc.). The processor(s) 720 may be configured to store any suitable received data in a corresponding data store. By way of example, data processing component 820 may be configured to receive entity data and store such data in entity data 808, a data store configured to store such information. In some embodiments, data processing component 820 may receive and store prior data (e.g., prior data 708 in FIG. 7) in prior data 810, a data store configured to store such information, or the data processing component 820 may be configured to access prior data 810 which may be managed by a separate system (e.g., a system associated with the payer's financial institution). Data processing component 820 may be configured to invoke the functionality of any other component of components 802 based at least in part on any suitable condition or trigger.

Model training component 822 may include any suitable number of programs, algorithms, computer readable instructions, that, when executed, train a generative model (e.g., the generative model 108 of FIG. 1, the generative model 308 of FIG. 3, etc.). In some embodiments, the generative model may be trained utilizing block diagram 300 of FIG. 3. The model training component 822 may retrieve a training data set from training data 804, a data store configured to store such information. In some embodiments, the model training component 822 may generate a training data set from prior data of corresponding to any suitable number of prior check transactions from any suitable number of accounts. This training data may be labeled by the system as legitimate examples and/or at least some portion of the training data examples may be manually labeled (e.g., via user input). In some embodiments, the model training component 822 may utilize prior articles determined as not having discrepancies and prior data as input to the image processing component 820 in order to obtain images (e.g., an image obtained from an instance of one or more images of prior articles of an account corresponding to the first and/or second entity) and/or one or more indications that the an image obtained from the prior data matches or mismatches a corresponding image obtained from a prior check image associated with the same account. In some embodiments, image processing component 820 may provide the images and/or a combined value indicating how often (e.g., via a percentage value) the image obtained from an instance of prior data matched one or more prior articles associated with corresponding account. Any suitable data obtained from the image processing component 820 may be included in a training data example generated by the model training component 822.

The model training component 822 may utilize one or more relevant algorithms for supervised training to train one or more models with the training data (e.g., generative model 308 as in FIG. 3, etc.). Additionally, the model training component 822 may function to periodically check the training data 804 for updated training data with which the model training component 822 may retrain or update any suitable model (e.g., generative model 308 as in FIG. 3, etc.). The model training component 712 may be configured to store any suitable data corresponding to the trained model within model data 806, a data store configured to store such information.

Image processing component 824 may be configured to compare an article (or a portion of the article such as a user-defined feature, etc.) to one or more prior articles (or portion of said images). The image processing component 824 may be configured to utilize generative model 308 as in FIG. 3 to generate image embeddings to compare the image embedding or portion of the image embedding of an article to one or more prior articles (or portion of prior image embeddings). In some embodiments, the image processing component 824 may be configured to generate a combined output that indicates (e.g., via a percentage or the like) how often the check image or portion of the image embedding of the matched prior image embeddings or portions of user-defined features. By way of example, the image processing component 824 may compare any suitable data discussed in connection with FIGS. 1-5 that is obtained from an image embedding of the article, to one or more instances of that same data obtained from corresponding images of prior image embeddings. In some embodiments, the combined output may be weighted such that matches between the image embedding and prior image embeddings of more recent articles are weighed more heavily than those of older articles. In some embodiments, image processing component 824 may store the output(s) and/or combined output within check-in-clearing entity data 808 or may provide the output(s)/combined output to detection component 826 directly (or via data processing component 820).

In some embodiments, the image processing component 824 may be used to determine a match between an image embedding/user-defined feature of an image of an article (or user-defined feature) and a prior image embedding/user-defined feature of a prior image embedding of a prior article (or user-defined feature). The input data and output data corresponding to this determination may be stored as a new training data example in training data 804. The new training data example may be used by the model training component 822 at any suitable time to train a new model and/or retrain or update a model stored in model data 806.

Detection component 826 may obtain the detection model from model data 806. The detection component 826 obtain any suitable combination of entity data 808 (which may include the output(s)/combined output generated by image processing component 824), prior data 810, and/or consortium data 812. The detection component 826 may be configured to provide any suitable combination of this data as input to the detection model and may receive output from the model indicating a likelihood that the corresponding image of an article contains a discrepancy or does not contain a discrepancy. In some embodiments, the detection component 826 may be configured to communicate with output manager 828 based at least in part on the output received from the generative model.

In some embodiments, the detection component 826 may be used to validate the model (e.g., the generative model 308 in FIG. 3). By way of example, training data from training data 804 may be provided as input to the model and the corresponding output may be used to perform the feedback procedure discussed in connection with FIG. 3 to confirm that the output provided by the model is accurate or inaccurate.

In some embodiments, the detection component 826 may be used to determine whether an article contains a discrepancy or does not contain a discrepancy. The input data and output data corresponding to this determination may be stored as a new training data example in training data 804. The new training data example may be used by the model training component 822 at any suitable time to train a new model and/or retrain or update a model stored in model data 806.

In some embodiments, detection component 826 any suitable combination of the input data provided to a generative model or the output data generated by the generative model to the output manager 828. The functionality performed with respect to output manager 828 may include aggregating data obtained from any of the components 820-626 and/or from data stores 804-612. In some embodiments, the output manager 828 may be configured to transmit a notification to one or more user device(s) (e.g., user device 104 of FIG. 1) that indicates that the detection component 826 has determined that an article contains a discrepancy or does not contain a discrepancy. In some embodiments, the notification may include any suitable data obtained from any of the components 820-626 and/or from data stores 804-612. By way of example, output manager 828 may be configured to present an image of an article that has been determined by the detection component 826 as containing a discrepancy or does not contain a discrepancy to a user via user device 104. In some embodiments, the output manager 828 may be configured to seek confirmation from the user that the article contains a discrepancy or does not contain a discrepancy.

The output manager 828 may be configured to allow or reject the transfer of the resource based at least in part on any suitable data obtained from the components 820-626 or any suitable data obtained from data stores 808-612. In some embodiments, allowing or rejecting the transfer of the resource may further depend on user input solicited via user device(s) 104 as described above. In addition, or alternatively, transferring of the resource may occur within a time interval of capturing an image of the article. For example, the time interval may be between one second and one minute, and more preferably between one second and thirty seconds.

Illustrative Examples

In a non-limiting example, a first entity (e.g., a first user) may wish to transfer a resource (e.g., payment) to a second entity (e.g., a second user). The first entity may use an article such as a check to transfer the resource to the second entity. The check may include user-defined features such as any suitable combination of check amount, serial/check number, the receiving bank's routing number, the deposit account number, the payer's account number, or any suitable information related to the check and/or the check transaction (e.g., one or more images of the pending check), a name, a signature, a driver license number, etc. In order to process the article, the second entity may capture an image, using a user device, of a first side of article (as discussed at 130 with respect to FIG. 1) and a second side of the article (e.g., image 206-2 with respect to FIG. 2). The second entity may sign the second side of the article with their signature to "endorse" the check. The second entity's signature may be identified as a user-defined feature (user-defined feature 251-1 with respect to FIG. 2) by the user device. The image of the article may be passed to a generative model containing the user-defined features (e.g., name, signature, institution log, etc.).

The generative model may process the image of the article to produce an image embedding of the article (as discussed in FIG. 3). In some examples, and as discussed in more detail with respect to FIG. 2, each side of the article may have a separate image embedding generated or the two images may be combined (by the user device or the generative model) into one image. The image embedding may then be processed and compared to prior image embeddings. For example, prior articles selected and/or used to generate prior image embeddings may include a set of one or more prior checks that may be identified by the user device (e.g., by the data processing component 820 of FIG. 8) from account data corresponding to the pending check transaction.

In some embodiments, the set of prior checks may correspond to a predefined number of the most recent check transactions corresponding to the account of the first or second entity, a set of check transactions that occurred within a threshold time period (e.g., the last thirty days, the last six months, the last year, etc.), or any suitable number of check transactions, and/or user-defined features that have been validated as legitimate such as any suitable combination of check amount, serial/check number, the receiving bank's routing number, the deposit account number, the payer's account number, or any suitable information related to the check and/or the check transaction (e.g., one or more images of a valid check), a name, a signature, a driver license number, etc.

The imaged embedding(s) may be compared to the prior image embeddings to determine a vector distance metric using a similarity measure to determine if a match exists or not. In a non-limiting example, the second entity may have stolen the check and is attempting to deposit the check in the second entities account. The second entity may try to endorse the check by writing their own name or by forging the name of the intended recipient. In either situation, the image embedding of the article may be processed to determine if user-defined features (e.g., name, signature, etc.) match prior image embeddings. For example, if the signatures do not match, then the user device may not permit transferring of funds (resources) from the first entity to the second entity since a discrepancy was found between the signatures or names. As a result, operations such as freezing the second entities account, notifying the first entity of the fraudulent activity, or notifying appropriate parties (e.g., fraud departments, etc.) may be performed. Each of the user-defined features may be compared to one another based on the first entity and second entity. For example, each of the check amount, serial/check number, the receiving bank's routing number, the deposit account number, the payer's account number, or any suitable information related to the check and/or the check transaction (e.g., one or more images of a valid check), a name, a signature, a driver license number for each entity may be compared to the prior image embeddings for similar features to determine whether or not a discrepancy exists.

In a non-limiting example, the user device may use the vector distance metric for the image embedding and additional information associated with the entities to control operations of a computer system (e.g., financial institution payment rail system, bank account, etc.). For example, if the vector distance metric indicates that discrepancies between user-defined features are within threshold tolerances, the user device may control the computer system to allocate the funds to the second entity from the first entity. In examples where a discrepancy is found, the user device may control the computer system to freeze an account associated with the first entity and/or the second entity, request additional information associated with the second entity (e.g., an image capture of the second entities face), and/or delay allocation of the funds associated with the first entity until further validation can be performed. In some examples, controlling the operations includes determining whether the first entity has a known association with the second entity (e.g., the first user commonly writes checks to the second user) based on a known parameter. The known parameter can include, without limitation, i) a relationship between the first entity and the second entity, ii) amount commonly transferred to/from one or both of the first entity or the second entity, iii) a name associated with the first entity or the second entity, iv) an organization associated with one or both of the first entity or second entity, or combinations thereof. In these examples, the known association may be used in conjunction with or in lieu of the vector distance metric.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, components, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program components, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about" or "substantially", "similar to", "similar", "approximately" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two stated extents and/or including one of the two stated extents.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:

receiving a first image associated with a first area of an article representing a transfer of at least one resource from a first entity to a second entity, wherein the first image represents a first user-defined feature of the article;

receiving a second image associated with a second area of the article, wherein the second image represents a second user-defined feature of the article;

providing, to a generative model, the first image and the second image;

receiving, from the generative model, a first embedding associated with the first image and a second embedding associated with the second image;

generating a combined embedding by combining the first embedding and the second embedding;

determining a vector distance metric based at least in part on a vector distance comparison between the combined embedding and a plurality of prior embeddings stored in a prior embedding datastore;

generating a training label indicating a match or mismatch based at least in part on the vector distance metric exceeding a predefined threshold;

assigning a sample weight to the training label that changes as a function of an age of a corresponding prior article from which a prior embedding of the plurality of prior embeddings was generated; and producing a trained generative model by training the generative model by modifying weights based at least in part on an error between a first generated output of the generative model and the training label.

2. The method of claim 1, wherein determining the vector distance metric further comprises:

performing an iterative process, the iterative process comprising:

determining one or more vector distances between at least one first location of the combined embedding and at least one second location of the plurality of prior embeddings; and performing a vector distance comparison based at least in part on the one or more vector distances; and repeating the iterative process for first additional locations of the combined embedding and second additional locations of the plurality of prior embeddings until the vector distance comparison meets a threshold criteria.

3. The method of claim 1, further comprising:

controlling a computer system to cause a distribution of the at least one resource to the second entity based at least in part on the vector distance metric and a second generated output of the trained generative model.

4. The method of claim 3, further comprising:

determining whether an association exists between the first entity and the second entity based at least in part on the first user-defined feature and a known parameter associated with the first user-defined feature, wherein controlling the distribution of the at least one resource is further based at least in part on the association and the vector distance metric.

5. The method of claim 1, wherein determining the vector distance metric further comprises:

determining whether a match between the combined embedding and the plurality of prior embeddings exists based at least in part on one or more vector distances, and wherein the method further comprises:

preventing a distribution of the at least one resource to the first entity or the second entity based at least in part on the match; and providing a notification to one or more client devices associated with the first entity or the second entity based at least in part on preventing the distribution.

6. The method of claim 1, further comprising:

generating an updated prior embedding datastore by adding the combined embedding to the prior embedding datastore.

7. The method of claim 1, further comprising:

receiving one or more additional images associated with another area of the article, wherein the another area is associated with a second user-defined feature of the article, the second user-defined feature being associated with the first entity;

extracting one or more image segments containing the second user-defined feature; and controlling a distribution of the at least one resource to the second entity based at least in part on the vector distance metric and the one or more image segments.

8. A computing device, comprising:

one or more processors; and one or more memories storing computer-executable instructions that, when executed by the one or more processors, cause the one or more processors to:

receive a first image associated with a first area of an article representing a transfer of at least one resource from a first entity to a second entity, wherein the first image represents a first user-defined feature of the article;

receive a second image associated with a second area of the article, wherein the second image represents a second user-defined feature of the article;

provide, to a generative model, the first image and the second image;

receive, from the generative model, a first embedding associated with the first image and a second embedding associated with the second image;

generate a combined embedding by combining the first embedding and the second embedding;

determine a vector distance metric based at least in part on a vector distance comparison between the combined embedding and a plurality of prior embeddings stored in a prior embedding datastore;

generate a training label indicating a match or mismatch based at least in part on the vector distance metric exceeding a predefined threshold;

assign a sample weight to the training label that changes as a function of an age of a corresponding prior article from which a prior embedding of the plurality of prior embeddings was generated; and produce a trained generative model by training the generative model by modifying weights based at least in part on an error between a first generated output of the generative model and the training label.

9. The computing device of claim 8, wherein determining the vector distance metric further comprises:

performing an iterative process, the iterative process comprising:

determining one or more vector distances between at least one first location of the combined embedding and at least one second location of the plurality of prior embeddings; and performing a vector distance comparison based at least in part on the one or more vector distances; and wherein the instructions further cause the one or more processors to:

repeat the iterative process for first additional locations of the combined embedding and second additional locations of the plurality of prior embeddings until the vector distance comparison meets a threshold criteria.

10. The computing device of claim 8, wherein the instructions further cause the one or more processors to:

control a computer system to cause a distribution of the at least one resource to the second entity based at least in part on the vector distance metric and a second generated output of the trained generative model.

11. The computing device of claim 10, wherein the instructions further cause the one or more processors to:

determine whether an association exists between the first entity and the second entity based at least in part on the first user-defined feature and a known parameter associated with the first user-defined feature, wherein controlling the computer system to cause the distribution of the at least one resource is further based at least in part on the association and the vector distance metric.

12. The computing device of claim 8, wherein determining the vector distance metric further comprises:

determining whether a match between the combined embedding and the plurality of prior embeddings exists based at least in part on one or more vector distances, and wherein the instructions further cause the one or more processors to:

prevent a distribution of the at least one resource to the first entity or the second entity based at least in part on the match; and provide a notification to one or more client devices associated with the first entity or the second entity based at least in part on preventing the distribution.

13. The computing device of claim 8, wherein the instructions further cause the one or more processors to:

generate an updated prior embedding datastore by adding the combined embedding to the prior embedding datastore.

14. The computing device of claim 8, wherein the instructions further cause the one or more processors to:

receive one or more additional images associated with another area of the article, wherein the another area is associated with a second user-defined feature of the article, the second user-defined feature being associated with the first entity;

extract one or more image segments containing the second user-defined feature; and control a distribution of the at least one resource to the second entity based at least in part on the vector distance metric and the one or more image segments.

15. A non-transitory computer-readable storage medium storing computer-executable instructions that, when executed with one or more processors of a computing device, cause the one or more processors to:

receive a first image associated with a first area of an article representing a transfer of at least one resource from a first entity to a second entity, wherein the first image represents a first user-defined feature of the article;

receive a second image associated with a second area of the article, wherein the second image represents a second user-defined feature of the article;

provide, to a generative model, the first image and the second image;

receive, from the generative model, a first embedding associated with the first image and a second embedding associated with the second image;

generate a combined embedding by combining the first embedding and the second embedding;

determine a vector distance metric based at least in part on a vector distance comparison between the combined embedding and a plurality of prior embeddings stored in a prior embedding datastore;

generate a training label indicating a match or mismatch based at least in part on the vector distance metric exceeding a predefined threshold;

assign a sample weight to the training label that changes as a function of an age of a corresponding prior article from which a prior embedding of the plurality of prior embeddings was generated; and produce a trained generative model by training the generative model by modifying weights based at least in part on an error between a first generated output of the generative model and the training label.

16. The non-transitory computer-readable storage medium of claim 15, wherein determining the vector distance metric further comprises:

performing an iterative process, the iterative process comprising:

determining one or more vector distances between at least one first location of the combined embedding and at least one second location of the plurality of prior embeddings; and performing a vector distance comparison based at least in part on the one or more vector distances; and wherein the instructions further cause the one or more processors to:

repeat the iterative process for first additional locations of the combined embedding and second additional locations of the plurality of prior embeddings until the vector distance comparison meets a threshold criteria.

17. The non-transitory computer-readable storage medium of claim 15, wherein the instructions further cause the one or more processors to:

control a computer system to cause a distribution of the at least one resource to the second entity based at least in part on the vector distance metric and a second generated output of the trained generative model.

18. The non-transitory computer-readable storage medium of claim 15, wherein the instructions further cause the one or more processors to:

determine whether an association exists between the first entity and the second entity based at least in part on the first user-defined feature and a known parameter associated with the first user-defined feature.

19. The non-transitory computer-readable storage medium of claim 15, wherein determining the vector distance metric further comprises:

determining whether a match between the combined embedding and the plurality of prior embeddings exists based at least in part on one or more vector distances, and wherein the instructions further cause the one or more processors to:

prevent a distribution of the at least one resource to the first entity or the second entity based at least in part on the match; and provide a notification to one or more client devices associated with the first entity or the second entity based at least in part on preventing the distribution.

20. The non-transitory computer-readable storage medium of claim 15, wherein the instructions further cause the one or more processors to:

generate an updated prior embedding datastore by adding the combined embedding to the prior embedding datastore.

* * * * *